(12) United States Patent
Wetmore

(10) Patent No.: US 10,574,932 B2
(45) Date of Patent: Feb. 25, 2020

(54) SYSTEM AND METHOD OF GENERATING SUBTITLING FOR MEDIA

(75) Inventor: Robert Evans Wetmore, Manhattan Beach, CA (US)

(73) Assignee: Fox Digital Enterprises, Inc., Los Angeles, CA (US)

(*) Notice: Subject to any disclaimer, the term of this patent is extended or adjusted under 35 U.S.C. 154(b) by 706 days.

(21) Appl. No.: 12/180,807

(22) Filed: Jul. 28, 2008

(65) Prior Publication Data
US 2010/0023753 A1   Jan. 28, 2010

(51) Int. Cl.
| | |
|---|---|
| *G06F 3/00* | (2006.01) |
| *H04N 5/445* | (2011.01) |
| *H04N 5/931* | (2006.01) |
| *H04N 21/488* | (2011.01) |
| *H04N 21/43* | (2011.01) |
| *H04N 21/235* | (2011.01) |
| *H04N 21/435* | (2011.01) |
| *H04N 21/222* | (2011.01) |
| *H04N 21/242* | (2011.01) |

(52) U.S. Cl.
CPC ............ *H04N 5/445* (2013.01); *H04N 5/931* (2013.01); *H04N 21/2223* (2013.01); *H04N 21/2351* (2013.01); *H04N 21/242* (2013.01); *H04N 21/4307* (2013.01); *H04N 21/4353* (2013.01); *H04N 21/4884* (2013.01)

(58) Field of Classification Search
CPC .... H04N 21/4316; H04N 21/00; H04N 5/445; H04N 5/931; H04N 21/4884; H04N 21/4307; H04N 21/2351; H04N 21/4353; H04N 21/2223; H04N 21/242
USPC .......... 715/204, 234, 243, 254, 255
See application file for complete search history.

(56) References Cited

U.S. PATENT DOCUMENTS

| | | | | |
|---|---|---|---|---|
| 5,929,854 A | * | 7/1999 | Ross | 715/783 |
| 6,623,529 B1 | * | 9/2003 | Lakritz | 715/205 |
| 2002/0065848 A1 | * | 5/2002 | Walker et al. | 707/511 |
| 2005/0191035 A1 | * | 9/2005 | Jung | G11B 27/105 386/243 |
| 2005/0273316 A1 | * | 12/2005 | Izuha | G06F 17/2863 704/9 |
| 2007/0101271 A1 | | 5/2007 | Hua et al. | |
| 2007/0189724 A1 | * | 8/2007 | Wan et al. | 386/96 |

(Continued)

FOREIGN PATENT DOCUMENTS

| | | |
|---|---|---|
| JP | 2006086599 | 3/2006 |
| KR | 1020070009891 | 1/2007 |

OTHER PUBLICATIONS

International Search Report and Written Opinion for PCT/US2009/051904 dated Feb. 26, 2010.

*Primary Examiner* — Kyle R Stork
(74) *Attorney, Agent, or Firm* — Farjami & Farjami LLP

(57) ABSTRACT

A method for media subtitling is described, wherein subtitles and/or captions for media are first created on a web interface in a first language along with the appropriate synchronization information with respect to the media. The document content may be created via the web interface, or it may be created locally and uploaded to the interface. Subsequent to creation and/or upload of at least a portion of the subtitling, personnel in different locations (e.g., different terminals or different countries) then access the web interface, which includes the first language and the synchronization information, to create foreign/alternative subtitling.

20 Claims, 1 Drawing Sheet

The Big Show
Reel: 4
New Language: Latin Spanish

| Count-Start | Count-End | Text | Comments |
|---|---|---|---|
| 101' 12" | 102' 8" | Where is William?<br>¿Donde está Guiermo? | William refers to her boy friend. |
| 105' 6" | Next | He's leaving.<br>Está saliento. | |
| 107' 1" | 108' 5" | Why?<br>¿Porque? | |
| 110' 0" | Next | He doesn't like the food.<br>No le gusta la comida. | They don't know he's dying |
| 112' 2" | 114' 14" | Shut up!<br>¡Cayate! | |

(56) References Cited

U.S. PATENT DOCUMENTS

2007/0225966 A1* 9/2007 Suen .................. G06F 9/454
                                                        704/9
2008/0281592 A1* 11/2008 McKoen ........... G06F 17/30781
                                                      704/235
2009/0150921 A1* 6/2009 Naylor ................ G11B 27/034
                                                       725/24

* cited by examiner

The Big Show
Reel: 4
New Language: Latin Spanish

| Count-Start | Count-End | Text | Comments |
|---|---|---|---|
| 101' 12" | 102' 8" | Where is William? ¿Donde está Guierrmo? | William refers to her boy friend. |
| 105' 6" | Next | He's leaving. Está saliento. | |
| 107' 1" | 108' 5" | Why? ¿Porque? | |
| 110' 0" | Next | He doesn't like the food. No le gusta la comida. | They don't know he's dying |
| 112' 2" | 114' 14" | Shut up! ¡Cayate! | |

SYSTEM AND METHOD OF GENERATING SUBTITLING FOR MEDIA

BACKGROUND

Traditionally, a multi-step process is used to generate subtitling for media, wherein paper documents or word processing files are first created and then sent to various parties who create corresponding foreign or alternative captions and subtitles. These documents or files are traditionally called "spotting sheets," which describe a first desired subtitling (e.g., in English) according to the desired position along a media timeline (often described as "the count" and called off in "feet" and "frames").

A translator must use the spotting sheet to generate the desired translation provided at the desired position along the media timeline. The various newly generated files are then reformatted and manually entered into a final form suitable for application to content.

As one can imagine, this multi-step process consumes a great amount of time and resources before a production complete with subtitling is ready to publish. What is needed in the industry is an effective method for subtitling that is considerably less time and resource consuming.

SUMMARY

The above described and other disadvantages of the prior art are overcome and alleviated by the presently described method for media subtitling, wherein subtitles and/or captions (the term "subtitling" will hereafter be construed to encompass captions as well) for media are first created on a web interface in a first language along with the appropriate synchronization information with respect to the media. The document content may be created via the web interface, or it may be created locally and uploaded to the interface. Subsequent to creation and/or upload of at least a portion of the subtitling, personnel in different locations (e.g., different terminals or different countries) then access the web interface, which includes the first language and the synchronization information, to create foreign/alternative subtitling. Once any desired alternative versions are generated, the web document(s) can then be converted into the final display format.

The web interface greatly reduces the time and resources by permitting multiple users to access, edit and/or generate alternative versions or portions through the web interface without sending hard copy documents or word processing files back and forth between plural users. In exemplary embodiments, multiple persons can work on the same or different parts of the content simultaneously and/or share changes or newly generated content amongst any or all of the plural users.

BRIEF DESCRIPTION OF THE DRAWINGS

Referring now to the drawings, wherein like elements are numbered alike in the following FIGURE:

FIG. 1 is an exemplary visual display of a web-based subtitling interface illustrating the subtitling language and synchronization information and a corresponding translation according to the first subtitling language and the synchronization information.

DETAILED DESCRIPTION

Reference will now be made in detail to exemplary embodiments, examples of which are illustrated by the accompanying drawings. As indicated above, the presently described system and method for subtitling media comprises a web based interface configured with document content in a first language along with appropriate synchronization information with respect to the media. The document content may be created via the web interface, or it may be created locally and uploaded to the interface. Subsequent to creation and/or upload of at least a portion of the subtitling, personnel in different locations (e.g., different terminals or different countries) then access the web interface, which includes the first language and the synchronization information, to create foreign/alternative subtitling. Once any desired alternative versions are generated, the web document(s) can then be converted into the final display format.

In exemplary embodiments, the web interface is configured to permit multiple persons to be working on the same or different parts of the contents simultaneously. In exemplary embodiments, versions or changes made by a user accessing the interface may be shared amongst any or all other users.

In an exemplary embodiment, where the web interface is utilized by a first user to generate the first content in a first language, additional users can immediately access the content and begin constructing alternative subtitling content or translations. A tracking mechanism may be used to keep track of who made changes, what the changes were, and when such changes were made. Also, for the first/original version, a notification system may be generated to notify secondary users (e.g., translators) of changes made to the original document so that such secondary users might adjust their version accordingly. The notification system may comprise popup notices, color coded text (e.g., showing strikethrough and underlined changes), etc.

Where appropriate, versions may be encrypted to prevent unauthorized access, with authorized parties possessing the necessary decryption keys.

The interface might also show various frames corresponding to different versions and/or synchronization data on the same interface. The users may also have access to the media (e.g., movie reel or spoiled/timecoded copy) to assist in formulating the best translation taking into account syllabic efficiency differences between languages. Such may also be presented in a separate frame or window. Time code corresponding to a spoiled copy may also be included in the interface. Where appropriate, the interface may also provide information on grade readability levels, vocabulary levels or word per minute cues for translators (e.g., when dealing with hearing impaired captions).

When all desired changes have been made to the document, and all alternate subtitling versions have been generated, the document(s) may be compiled (if they are not initially edited as parts of the same overall document) and converted to a final format used for production (e.g., XML format such as is used for cinema subtitling). Such final format may then be posted to wherever media packaging is performed.

An example of a web interface for generating subtitling is illustrated at FIG. 1, which shows an exemplary visual display of a web-based subtitling interface illustrating the subtitling language and synchronization information. FIG. 1 further illustrates a corresponding translation according to the first subtitling language and the synchronization information. In FIG. 1, the term "Count-Start" is the foot and frames count where the subtitle first appears. The term "Count-End" is the foot and frames count where the subtitle disappears. The term "Next" means that the subtitle start or end time is butted directly up to the adjacent subtitle. Under the heading "Text", the initial line on each identified count is inserted during the spotting operation. The following line (written here in Latin Spanish) is inserted by the foreign language or captioning person.

The present system and method for generating subtitling content for media eliminates the time lags and required resources associated with traditional subtitling methods, which require that documents or document files be passed back and forth between plural editors and translators, followed by manual compilation of all versions. By providing the web interface, users around the world can quickly work together to generate the final subtitling format.

It will be apparent to those skilled in the art that, while exemplary embodiments have been shown and described, various modifications and variations can be made to the subtitling system disclosed herein without departing from the spirit or scope of the invention. Accordingly, it is to be understood that the various embodiments have been described by way of illustration and not limitation.

What is claimed is:

1. A method for generating media subtitling, the method comprising:
    receiving, via a web-based interface, subtitling content in a first language along with synchronization information for a timecoded media, wherein the synchronization information for each of a plurality of subtitling text portions of the subtitling content is according to a timeline of the timecoded media;
    subsequent to the receiving of the subtitling content, providing access to the subtitling content to personnel in different locations for receiving, via the web-based interface, foreign or alternative subtitling texts to be included in the subtitling content;
    receiving from the personnel, via the web-based interface, the foreign or alternative subtitling texts for each of the plurality of subtitling text portions of the subtitling content; and
    including, in the subtitling content the foreign or alternative subtitling texts received from the personnel for each of the plurality of subtitling text portions of the subtitling content, according to the timeline of the timecoded media.

2. The method in accordance with claim 1, wherein after the including, the method further comprises converting subtitling content into a final display format.

3. The method in accordance with claim 1, wherein the subtitling content is created via the web-based interface.

4. The method in accordance with claim 1, wherein the subtitling content is created locally and uploaded via the web-based interface.

5. The method in accordance with claim 1, wherein the web-based interface is configured to permit multiple persons to be working on the same or different parts of the subtitling content simultaneously.

6. The method in accordance with claim 1, wherein versions or changes made by any of the personnel accessing the web-based interface are shared amongst any or all the other personnel.

7. The method in accordance with claim 1, wherein the web-based interface is utilized by any of the personnel to generate the subtitling content in the first language, and the web-based interface is configured such that the other personnel can immediately access the subtitling content and begin constructing the foreign or alternative subtitling texts.

8. The method in accordance with claim 7, wherein a tracking mechanism is used to keep track of which one of the other personnel made changes, what the changes were, and when the changes were made.

9. The method in accordance with claim 8 further comprises notifying the personnel of the changes.

10. The method in accordance with claim 9, wherein the notifying comprises pop-up notices or color coded text.

11. The method in accordance with claim 1, wherein the subtitling content and any subsequently generated versions of the subtitling content are encrypted to prevent unauthorized access.

12. The method in accordance with claim 1, wherein the timeline of the media is described using count starts and count ends.

13. The method in accordance with claim 1, wherein the web-based interface provides the personnel access to the timecoded media to assist the personnel in formulating the foreign or alternative subtitling texts taking into account syllabic efficiency differences between foreign languages.

14. The method in accordance with claim 1, wherein the synchronization information additionally comprises a comments field.

15. The method in accordance with claim 14, wherein the comments field provides characterization of the plurality of text portions in said text the subtitling content.

16. The method in accordance with claim 1 further comprising:
    displaying, via the web-based interface, timecodes of the timecoded media.

17. The method in accordance with claim 12, wherein the subtitling content and the synchronization information are organized and presented in sequence according to the count starts and the count ends.

18. The method in accordance with claim 17, wherein the subtitling content and synchronization information are organized in a chart form according to the count starts and the count ends.

19. The method in accordance with claim 1 further comprises:
    displaying, via the web-based interface, word per minute cues for use by the personnel providing the foreign or alternative subtitling texts.

20. The method in accordance with claim 1 further comprises:
    displaying, via the web-based interface, grade readability levels or vocabulary levels for use by the personnel providing the foreign or alternative subtitling texts.

* * * * *